Patented July 29, 1952

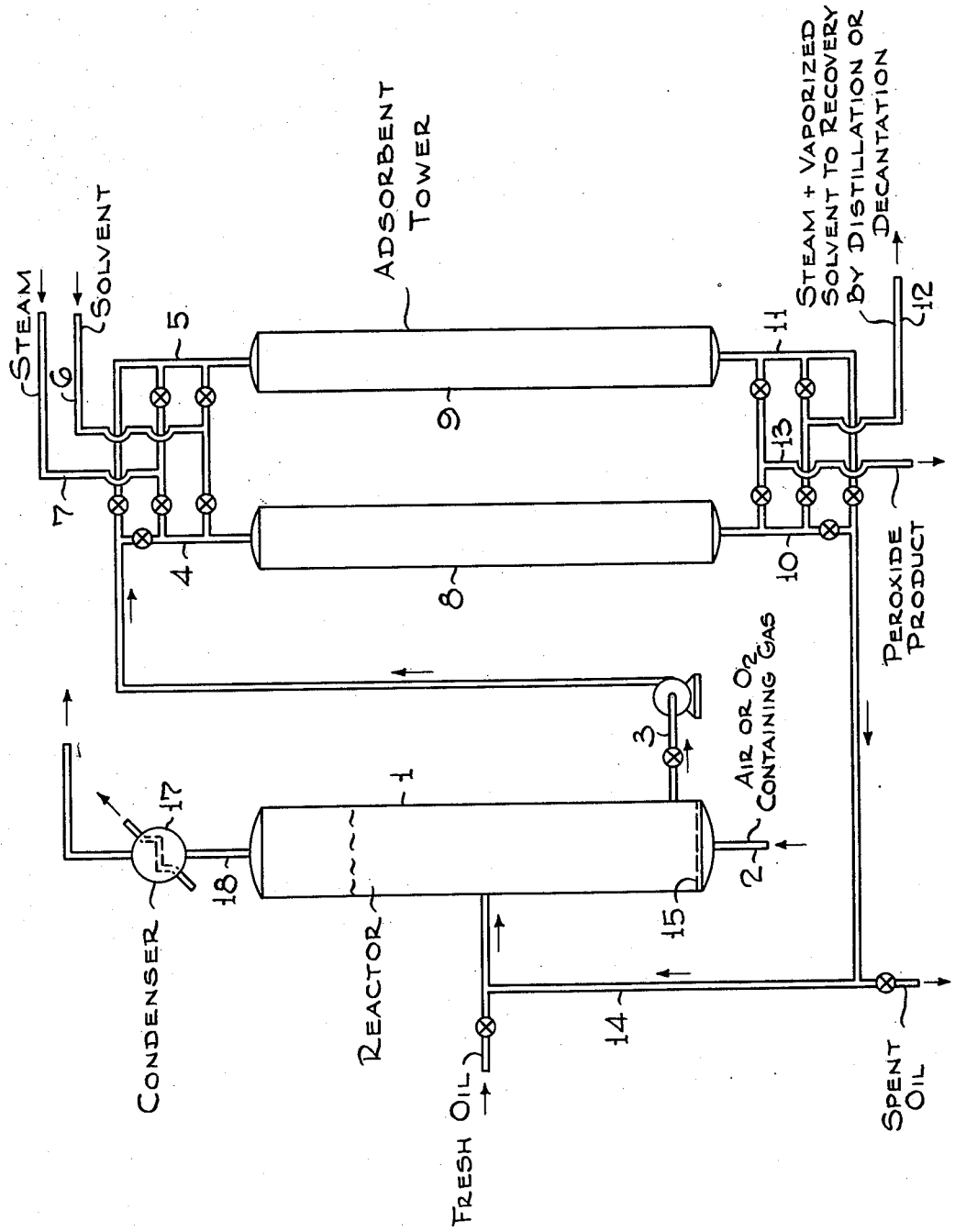

UNITED STATES PATENT OFFICE 2,605,290

PROCESS FOR THE PRODUCTION AND RECOVERY OF ORGANIC PEROXIDES

Anthony E. Robertson, Silver Spring, Md., and Allen R. Jones, Roselle, N. J., assignors to Standard Oil Development Company, a corporation of Delaware Application September 11, 1948, Serial No. 48,886

1 Claim. (Cl. 260—610)

This invention relates to an improved method for the production and recovery of organic peroxides from relatively volatile petroleum fuel fractions.

In the manufacture of peroxide ignition promoters for diesel fuels and other related uses by the direct oxidation of a hydrocarbon oil, the concentrations and consequent yields of peroxides obtainable are limited by the instability of the products at reaction temperatures. It is therefore desirable to remove the peroxide products fairly rapidly in order to avoid any undesirable build up.

These peroxide products comprise largely naphthenic hydroperoxides. Among the hydrocarbons oxidized by this process are cycloalkanes, mono- and polyalkyl substituted alkanes and various condensed ring structures. The peroxides produced include among others cyclopentyl hydroperoxides, cyclohexyl hydroperoxides, methyl ethyl cyclohexyl hydroperoxides, etc.

It has now been found that these organic peroxides can be obtained by a commercially feasible continuous process comprising oxidizing the relatively volatile petroleum fractions at reasonably low temperatures and continuously removing these peroxides by adsorption on a suitable adsorbent. The peroxides can then be desorbed by the use of low molecular weight polar organic solvents, for example, ketones such as acetone and methyl ethyl ketone; alcohols such as methyl, ethyl and isopropyl; halogen-containing compounds such as ethylidine chloride and chloroform; esters such as ethyl, propyl, butyl and amyl acetates; etc. Preferably oxygen-containing polar organic solvent should be used.

The exact nature of the petroleum oil feed to be used has been found to be important for obtaining high peroxide numbers under the conditions of this invention. The factors which have been found to be important in the choice of the oils are a relative freedom from asphalts or resins, and relative volatility of the petroleum fractions themselves. Straight run petroleum distillates are preferred as initial materials and such distillates may be first sulphuric acid treated before subjection to oxidation. They may also be extracted with aromatic extracting agents such as liquid sulphur dioxide, aqueous phenol, aqueous aniline or equivalent material to remove excess aromatics. Straight run distillates of boiling points within the range of 80 and 190° C. are preferred, which are substantially free of unsaturates. It is to be understood that the term "relatively volatile petroleum fraction" as used herein refers to petroleum stocks of the character described.

The preferred adsorbent for the process of this invention is silica gel, although other peroxide adsorbents such as active alumina, clay or activated carbon may be utilized.

This invention will be further explained by reference to the attached flow diagram.

The relatively volatile oil to be oxidized is charged to reactor 1 equipped with a porous distributor plate 15 and blown with air or an oxygen-containing gas entering through line 2. Oil that leaves overhead with gas vented overhead through line 18 is condensed in condenser 17 and returned to the reactor 1. After the peroxide content of the oil has increased to the desired extent, the oil is pumped from reactor 1 through lines 3 and 4 into adsorption tower 8. The dissolved peroxides formed by the oxidation are removed in tower 8 by adsorption on silica gel, conveniently by percolation. The percolated oil is then recycled through lines 10 and 14 to the reactor 1 or a portion of the oil may be removed from the system and fresh oil charged at the equivalent rate. When sufficient peroxides are adsorbed on the gel in tower 8, the flow of oil is diverted into the other adsorption tower 9 through line 5.

Peroxides are then removed from the solid adsorbent gel in adsorption tower 8 by contacting with a solvent, for example, acetone entering through lines 6 and 4. The peroxide solution is withdrawn through lines 10 and 13, and the peroxides may be concentrated by evaporation of the solvent elsewhere. The adsorbent in tower 8 is then reactivated by removal of occluded and adsorbed solvent, for example, by means of steam which is introduced through lines 7 and 4. The vaporized solvent and steam then leave the tower 8 through lines 10 and 12. The solvent can be recovered elsewhere from the steam by fractional distillation or in the case of solvents immiscible with water by condensation and decantation. It is desirable to remove adsorbed water from the adsorbent following the steaming operation, for example, by means of a heated gas such as air, nitrogen or flue gas which is passed through the tower. In some cases sufficient reactivation is obtained by the treatment with hot gas alone, so that steaming is not required.

The oxidized petroleum oil can thus be alternately fed into towers 8 or 9 permitting continuous operation and regeneration of the adsorbent. This process may also be carried out continuously by employing the adsorbent in a finely divided form. In this case the adsorbent continuously charged to the top of an adsorption tower is passed countercurrent to the peroxide-containing oil. Adsorbent plus adsorbed peroxide is withdrawn from the bottom of the adsorption tower, excess oil being removed by washing or by filtration or by centrifuging. The adsorbent is then introduced similarly into a desorption tower where it is contacted countercurrently with the peroxide solvent. Reactivation of the adsorbent is carried out in an analogous manner and the adsorbent is then recycled to the adsorption tower.

In preparing the partially oxidized modified oils by the process described, no catalysts are required or desired.

At the start of the reaction, previously prepared peroxides may be added to the oil in the reactor to the extent of up to about 1% to initiate the oxidation. During the course of the reaction the oil is circulated between reactor 1 and absorbent tower 8 or 9 at a rate sufficient to maintain this or a slightly higher concentration of peroxides in the reactor.

In general, suitable operating ranges are approximately as follows:

Oxidation temperature, °C____ 115–165°
Air rate, vol./vol. oil/hr_____ 100–500
Pressure _____ Atm.—500 p. s. i.
Adsorbent ratio, vol./vol. oil___ 0.1–1.0
Solvent ratio, vol./vol. absorbent _____ 0.5–5.0

As indicated by the temperature limits, the process of this invention is conducted in the liquid phase. It is preferred that the pressure be sufficient to prevent excessive vaporization of oil by the gas passed therethrough.

It will be observed that the process for the recovery of the peroxides is adapted for use regardless of the method employed for oxidizing the petroleum fuel feed. The boiling point range of the petroleum fractions listed is the one that yields the desired ignition promoters. It should be emphasized however that the method of this invention for recovering organic peroxides is applicable to a much wider range of petroleum oils.

This is illustrated by the following example of the concentration and recovery of peroxides from a gas oil which had developed peroxides in storage.

*Example*

In the experiment, 400 ml. of a blend of two cuts from a process gas oil which had developed peroxides in storage was percolated through 100 ml. of 200 mesh silica gel. The unadsorbed oil had a volume of 345 ml. (86.2% of the charge) and had a peroxide number of 1.4. The silica gel was divided into four equal portions and each treated with 25 ml. of solvent to remove the adsorbed peroxides. The peroxide solutions were then filtered and brought to a volume of 100 ml. by the addition of more solvent. In one case water was employed to remove the adsorbed peroxides and toluene was used to dilute the oil desorbed by the water. The peroxide number of the original oil was 56.3. Peroxide number determinations on the final solutions show the following results:

Peroxide number is the gram equivalents of active oxygen per 1000 liters of oil. It can be seen that a fourfold increase in concentration of peroxides with a recovery of 60% was obtained, and that the best results were obtained with the oxygen containing polar organic solvents. Further increases in concentration can be obtained by evaporation of the solvent. Various modifications with the adsorbent are readily apparent to one skilled in the art, for example, the adsorbent may be disposed as a stationary granular bed, as a moving column of granular material, or as a so-called fluid powder. The fundamental requirements are simply intimate contacting of the oil in liquid phase with the adsorbent.

It is to be understood that the invention is not limited to the specific examples which have been offered as illustrations and that modifications may be made within the scope of the claim without departing from the spirit of the invention.

What is claimed is:

A continuous process for preparing and concentrating organic peroxides containing two atoms of oxygen per molecule in the peroxide linkage which comprises the steps of oxidizing a straight run petroleum hydrocarbon fraction boiling in the range of 80 to 190° C., in the liquid phase with air at a temperature of 115–165° C., continuously passing the resulting stream of petroleum hydrocarbons containing organic peroxides formed during reaction in said oxidation step into a silica gel adsorption zone to adsorb the peroxides on the silica gel, contacting the adsorbent containing the adsorbed peroxides with acetone to desorb the peroxides; recycling the residual oxidized petroleum fraction from the adsorption step to the oxidation step; and reactivating the silica gel by contacting it with steam.

ANTHONY E. ROBERTSON.
ALLEN R. JONES.

REFERENCES CITED

The following references are of record in the file of this patent:

UNITED STATES PATENTS

| Number | Name | Date |
| --- | --- | --- |
| 2,076,524 | Behrens | Apr. 13, 1937 |
| 2,115,207 | Milas | Apr. 26, 1938 |
| 2,398,101 | Lipkin | Apr. 9, 1946 |
| 2,410,642 | Farkas | Nov. 5, 1946 |
| 2,430,864 | Farkas | Nov. 18, 1947 |
| 2,447,794 | Brewer | Aug. 24, 1948 |
| 2,526,499 | Paulsen | Oct. 17, 1950 |

OTHER REFERENCES

Morton: "Lab. Technique in Org. Chemistry," 1st edition (1938), pages 185–193.

| Solvent Used | Recovery of Solvent | | Peroxide No. of Diluted Solution | Peroxide No. of Concentrate | Percent increase in Concentration Over original Oil | Percent Recovery of Peroxides |
| --- | --- | --- | --- | --- | --- | --- |
| | Cc. | Volume Percent | | | | |
| Water | 10 (oil) | 50 | 16.3 | 163 | 290 | 29.0 |
| Chloroform | 16 | 64 | 20 | 125 | 222 | 35.5 |
| Acetone | 15 | 60 | 34 | 227 | 403 | 60.4 |
| Amyl Acetate | 16 | 64 | 30 | 188 | 334 | 53.3 |
| Unadsorbed Oil | | | | 1.4 | | |